United States Patent [19]
Ryan

[11] Patent Number: 5,876,649
[45] Date of Patent: Mar. 2, 1999

[54] PROCESS OF MAKING A LOAD-CARRYING STRUCTURE

[76] Inventor: Dale B. Ryan, 1001 Chalkstone Dr., Mitchell, S. Dak. 57301

[21] Appl. No.: 908,589

[22] Filed: Aug. 8, 1997

Related U.S. Application Data

[63] Continuation-in-part of Ser. No. 696,484, Aug. 14, 1996, abandoned.

[51] Int. Cl.[6] .............................. B29C 47/02; B29C 70/28
[52] U.S. Cl. .................... 264/136; 264/149; 264/171.13; 264/265
[58] Field of Search ..................... 264/135, 136, 264/149, 171.13, 265

[56] References Cited

U.S. PATENT DOCUMENTS 3,544,669  12/1970  Schock ............................... 264/171.13
4,774,121   9/1988  Vollenweider, II ..................... 428/117

FOREIGN PATENT DOCUMENTS 2126319  12/1971  Germany ............................... 264/265
53-55372   5/1978  Japan ................................ 264/171.13

OTHER PUBLICATIONS

Chemical Abstracts 107:135345q, 1987.
Chemical Abstracts 116:199922u, 1992.
Chemical Abstracts 117:173557z, 1992.
Chemical Abstracts 118:148517z, 1993.
Chemical Abstracts 122:107321v, 1995.
Chemical Abstracts 122:241192g, 1995.

*Primary Examiner*—Leo B. Tentoni

[57] ABSTRACT

Shaped load-carrying structures are fabricated using bamboo linear fibers with a compatible bonding material and synthetic polymers such as polyesters, epoxies, and polyolefins. The structures are manufactured by coating at least one of bamboo culms, split bamboo culms, bamboo fiber tape, or prepared bamboo fibers with a bonding material to produce a core. The core is then combined with a polymer matrix and extruded or molded to form a structure having the desired shape. The structures compare favorably with wood, steel, and concrete regarding strength, longevity, price and ability to withstand earthquakes. The structures may be used as beams, columns, telephone poles, and marine piles.

7 Claims, 7 Drawing Sheets

PROCESS OF MAKING A LOAD-CARRYING STRUCTURE

CROSS-REFERENCE TO RELATED APPLICATIONS

This is a continuation-in-part of application Ser. No. 08/696,484, filed Aug. 14, 1996 now abandond.

BACKGROUND OF THE INVENTION

1. Field of the Invention

This invention relates to poles, pilings, and load-carrying structures, such as beams and columns, made up of linear bamboo fibers bonded to, and surrounded by, synthetic polymers and to processes of preparing these structures.

2. Description of the Related Art

Presently, wood timber beams and columns depend on specie and dimensional size as the only engineering variables. Paint and other chemical treatments are used to lengthen the life of wood products that are exposed to the elements. However, there has been a growing concern over these toxic chemical treatments. Creosote, which has been used for years, is now considered to be a carcinogen, and has been banned from marine timber applications where immersion allows seepage into surrounding waters. Utility companies are aware of the danger these preservatives present to their linemen and material handling people. Managed forests are producing faster growth but lower grade timber than was available a few years ago. This new timber sometimes does not pass the ANSI standards for timber pole structures.

Concrete with reinforcing steel has a greater ability to be custom engineered for various specific applications. However, the resulting products are extremely heavy, and in the case of load-carrying structures, such as bridges, the greatest portion of the structure is involved in holding itself up. This extreme weight forces many concrete structures to be fabricated on-site as opposed to being built in the factory. This adds greatly to the cost of these products. Also, concrete is very sensitive to motion, such as caused by earthquakes. Thermal expansion and freeze-thaw cycles wreak havoc on concrete components. A lightweight load-carrying beam or column that would not be sensitive to seismic or temperature changes would be a very desirable replacement for concrete.

Structural steel is extensively used for beam and column applications due to its strength, workability, and other factors. Steel has an on-going maintenance problem due to rust and corrosion that shortens its life span. Also, energy costs to produce steel and fabricate with steel are quite extensive, keeping the price of the raw materials and finished products high.

Fiberglass is being researched and new products are being developed regularly, but the high cost of glass fibers and the resin matrices has proven to be a formidable barrier to overcome.

Bamboo has been considered for use in weight-bearing structures. Thus, Chemical Abstracts 107:135345q (1987) discloses composite materials containing 0.3–1 mm long bamboo strips, powdered bamboo, powdered wood, and resin in a molded piece. Chemical Abstracts 122:107321v (1995) discloses bamboo fibers as a reinforcing material for resinous composite structural panels. Chemical Abstracts 122:241192g (1995) discloses bamboo fibers and strips as reinforcing materials for thermosetting resin structural materials. Chemical Abstracts 118:148517z (1993) discloses strands of bamboo fibers as reinforcing materials for resinous laminates. Chemical Abstracts 117:173557z (1992) discloses bamboo fiber reinforced plastic structural materials. This reference also teaches a perfect bonding between the bamboo and the resin. Chemical Abstracts 116:199922u (1992) discloses bamboo fibers treated with a binding agent used in concrete structural materials. U.S. Pat. No. 4,774, 121 to Vollenweider, II discloses blocks comprising stalks of bamboo surrounded by plastic foam cut into thin sections and coated with fiber reinforced plastic to be used in boat construction. The inventor has found that, contrary to the teachings of Chemical Abstracts 117:173557z, the use of untreated bamboo fibers as reinforcing agents for resinous structural materials results in slippage between the bamboo fibers and the resin matrix.

The present invention seeks to eliminate the above-noted disadvantages by providing a low-cost, high-strength composite formed from linear bamboo fibers bonded to synthetic polymers with binding agents which have been found to provide exceptional binding between the bamboo fibers and the polymer matrix. These composites can replace wood, concrete, steel, or fiberglass reinforced polymers in poles, pilings, and load-carrying structural applications.

SUMMARY OF THE INVENTION

This invention seeks to provide an improved composite that has the ability to overcome the disadvantages of the presently available structural materials. In accordance with this invention, a composite structural piece is provided which comprises linear bamboo fibers bonded to and surrounded by synthetic polymers such as thermoplastic and thermosetting resins.

In preparing the products of this invention, bamboo fibers of dimensionally equal sizes are treated or primed with a bonding material to be described below so as to accept a synthetic polymer. The fibers may take the form of split culms or tape. The products may be prepared by extruding a mixture of primed linear bamboo fibers and synthetic polymers or the product may be prepared by molding the mixture. The products may desirably take the form of beams, columns, or poles.

BRIEF DESCRIPTION OF THE DRAWING

FIG. 6a is a graphical representation of the extrusion machine having a circular die used according to this invention.

FIG. 6b is an elevational view of a rectangular die used according to this invention as a replacement for the circular die in the extrusion machine of FIG. 6a.

DESCRIPTION OF THE PREFERRED EMBODIMENTS

The invention will now be described with reference to the above drawing. In all Figures, like numerals represent like features. In accordance with this invention, a load-carrying structure 1 is provided which comprises linear bamboo fibers 6 bonded to, and surrounded by, synthetic polymers 8. The bamboo fibers 6 may be in the form of split culms 17 or tapes. The structures 1 are made from bamboo culms 17 which are split into dimensionally equal sizes and treated with a bonding material 7.

It has been found that the following binding agents give surprisingly good bonding between the bamboo and the polymer matrix. maleated polypropylene, maleated polyethylene, maleic anhydride, hydroxyl methacrylate, silane compounds, N-vinyl pyridine, N-vinyl caprolactam, N-vinyl carbazole, methacrylic acid, ethyl methacrylate, isobutyl methacrylate, sodium styrene sulfonate, bis-vinyl phosphate, divinyl ether-ethylene glycol, vinyl acetate, vinyl toluene, vinylidene chloride, chloroprene, isoprene, dimethylaminoethyl methacrylate, isocetylvinyl ether, acrylonitrile, glycidyl methacrylate, N-vinyl pyrrolidone, acrylic acid, ethyl acrylate, itaconic acid, methyl acrylate, sodium vinyl sulfonate, cetyl vinyl ether, divinyl ether-butanediol, and octadecyl vinyl acetate.

Figures 6A, 6B:
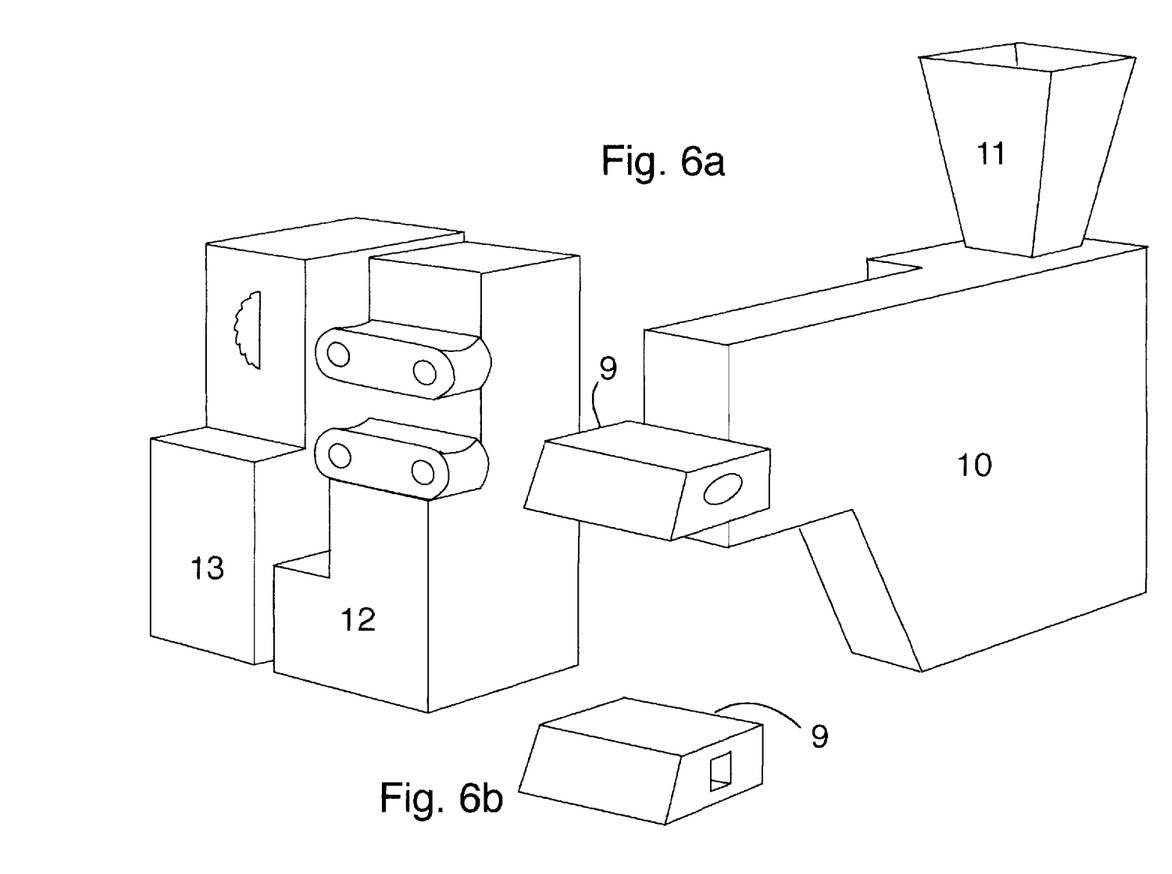

According to one aspect of this invention, a plastics extruding line 10 is connected to a die 9 that allows the bamboo fibers 6 primed with at least one of the above binders to fill the outside circumference of a die 9. The primed bamboo fibers 6 enter the die 9 as heated plastic 8 is injected under high pressure and caused to flow through the interior of the die 9. The mixture of primed bamboo fibers 6 and plastic 8 is extruded as a column and enters powered pullers 12 that are capable of extracting the column to form any practical length. A power saw 13 travels beside the extruded piece, sawing it to a desired length without slowing the extruding process. The traveling saw 13 returns to its starting point to select the next length. The thus-prepared composite structure 1 is transferred to a water-cooled bath 14 where it is cooled to ambient temperatures and the sawed ends are capped.

Figure 7:
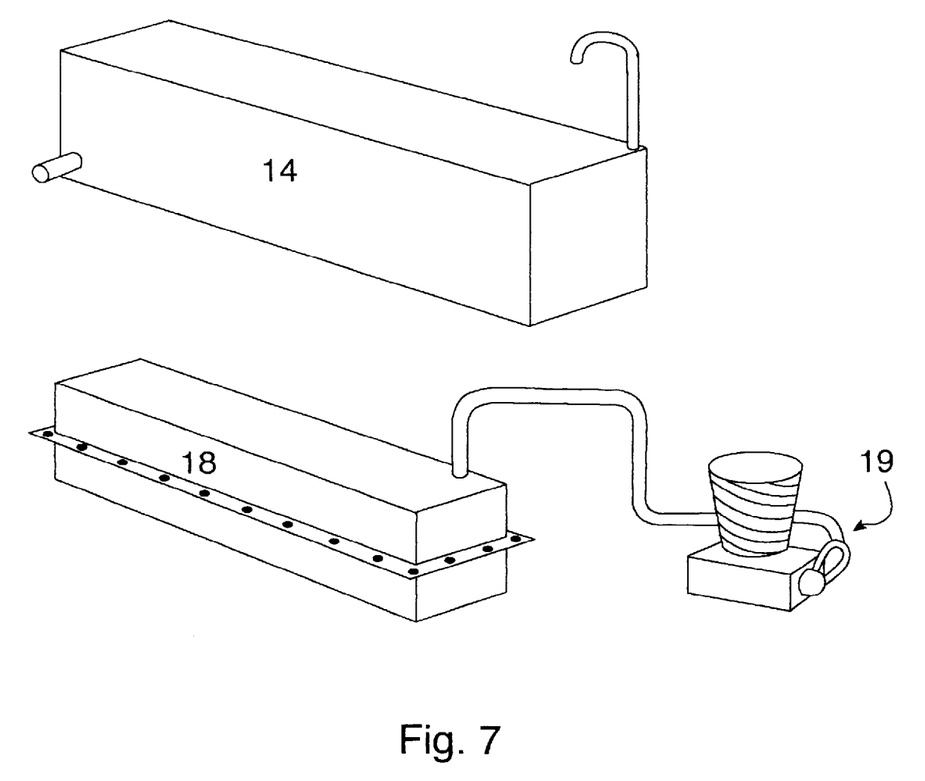
FIG. 7 is a graphical representation of a cooling bath and a molding apparatus used according to this invention.
Figure 8:
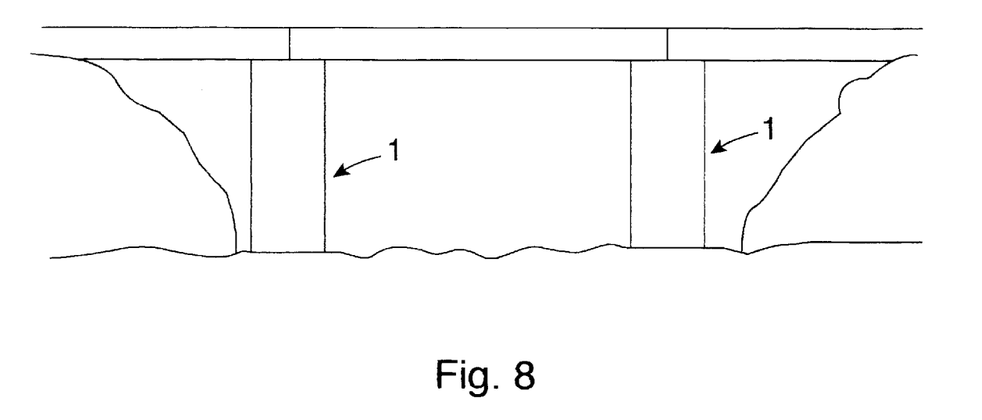
FIG. 8 is a side elevational view of a bridge made using supporting columns prepared according to this invention.

In an alternate method of preparing bamboo fiber 6/plastic 8 composite structures 1 according to this invention, the bamboo fibers 6 are primed by coating at least one of the above binders by immersing the bamboo fiber in a bath of the primer, spraying the binder onto the bamboo fiber, or brushing the primer onto the bamboo fiber. The primed bamboo fiber is secured to a carrying core 2 of wood or metal to form a core assembly and this core assembly is inserted into a mold 18 and positioned so as to allow clearance for the plastic 8 matrix to flow around all exposed surfaces in desired thicknesses. The mold 18 is heated and connected to an extruder 10 or large injection molding machine. Some molds may require a vacuum to be pulled by a vacuum system 19 on the interior of the mold 18 prior to injection. The synthetic polymer 8 is then injected, the mold 18 is chilled, and the resulting composite structure 1 is removed from the mold 18.

Some plastics have an almost unlimited life span when exposed to the elements. This explains the ability of fiberglass to dominate the marine market where wood and steel require too much maintenance. However, plastics by themselves lack sufficient tension and compression strength to stand alone as load-carrying structures. The marine industry solved this problem with the addition of glass fibers to the plastic matrix resulting in fiberglass. This engineered composite has three times the load-carrying capability of steel of an equal weight. The cost of glass fiber reinforced plastics has limited this material to special products and niche markets. Asian and some South American bamboo species such as Gradua and Tonkin cane have tension strength close to steel and compressional strength exceeding concrete. At $\frac{1}{100}$ the cost of glass fiber, linear bamboo fiber can be more competitive with traditional materials. By utilizing fiber in a plastic matrix the resulting composite is very strong and has the nearly unlimited life span of the plastic exterior.

In order to produce beams and columns from the composite of this invention, the bamboo linear fiber 6 must bond to the plastic matrix 8. The elongation of the plastic glue allows the load to be evenly distributed along all of the unidirectional bamboo fibers 6. This is the key to the exceptional strength of the composite structures 1 of this invention. A bonding material 7 of at least one of the materials named above, preferably acrylic acid, is used, allowing difficult matrices, such as polyethylene, to bond to the bamboo fibers 6.

Figure 1:
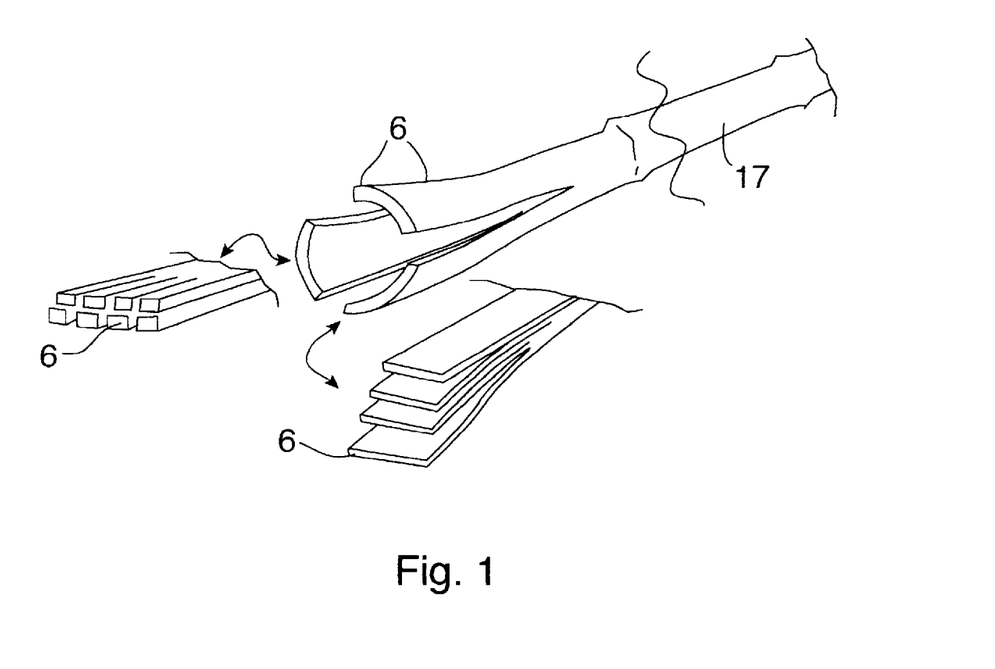
FIG. 1 is an elevational view of a split bamboo culm and gives a pictorial explanation of the making of bamboo fibers and tapes useful in this invention.

In making the structures 1 of this invention, a bamboo culm 17 is split to its desired size. The fibers 6 may take the form of a full width split bamboo culm, smaller slices, or a tape. In all Figures of this description, linear bamboo fiber refers to all three of these possibilities.

Figure 3:
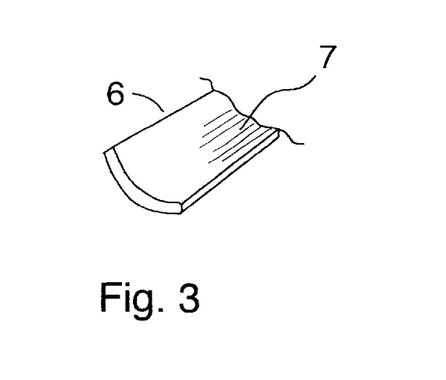
FIG. 3 is an elevational view of a primed split bamboo culm.

The linear bamboo fiber 6 is treated with at least one bonding agent 7 as described above, most preferably acrylic acid or maleic anhydride or salt or ester derivatives thereof, to promote the adhesion of the fibers 6 to the synthetic polymer matrix 8. The synthetic polymer 8 may be a thermosetting resin or a thermoplastic resin.

Figure 2:
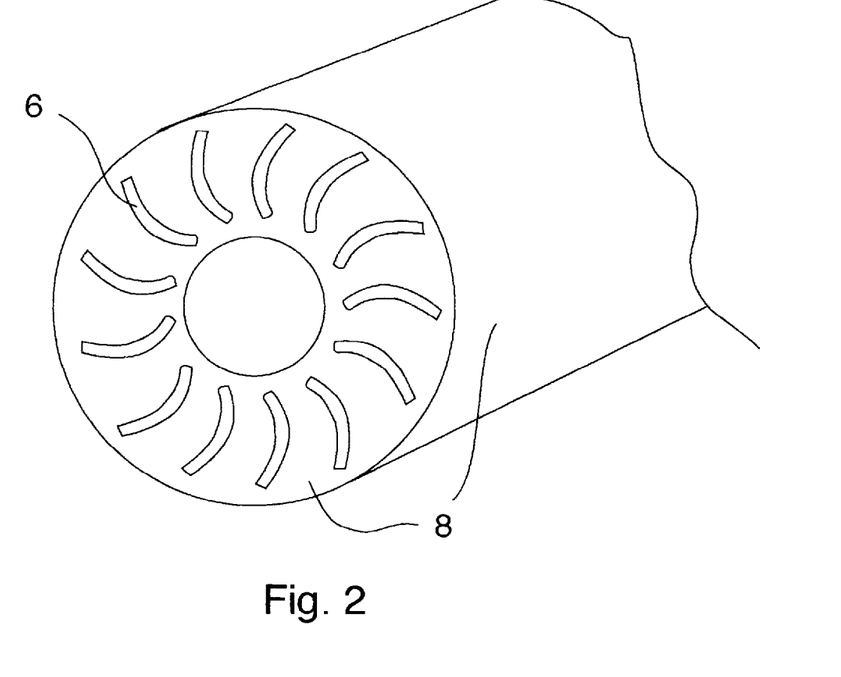
FIG. 2 is an elevational view showing a utility pole prepared according the extruding method of this invention.

With reference to FIG. 6a, in preparing poles or pilings, dried and split bamboo culms 17 of a length equal to the pole or piling being produced are treated with a bonding material 7 as described above and inserted into the die 9 and a synthetic polymer 8 such as recycled polyethylene pellets is loaded into the hopper 11 of the extruder 10. The extruder 10 is heated to melt the polymer 8. The extruder 10 is turned on and the pushers or pullers 12 start to insert the bamboo fiber 6 reinforcement into the proximal end of the heated die 9 while the extruder 10 begins to inject molten plastic 8 into the die 9. The molten plastic 8 completely envelopes the bamboo fiber 6 and the mixture of bamboo fiber 6 and synthetic polymer 8 starts to emerge from the distal end of the heated die 9. At a proper time, the puller 12 engages the cooled composite extrudate as it emerges from the die 9. This process continues until the desired length of extrudate is obtained. The traveling saw 13 starts sawing off the desired length of extrudate and automatically returns to the starting position to begin sawing the next section. The newly extruded pole or piling is chilled in a circulating water bath, 14 and when sufficiently cooled is placed into storage.

Figure 4:
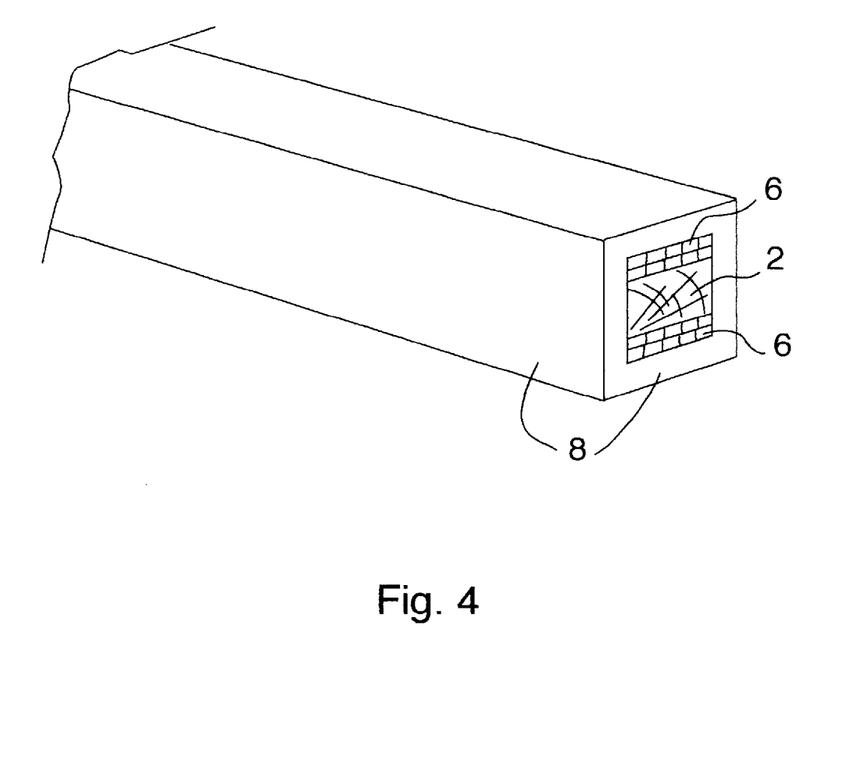
FIG. 4 is an elevational view of a beam containing a synthetic polymer circumference and an interior comprising bamboo fiber and wood prepared according to the molding method of this invention.

A cross-arm for a utility pole may be similarly constructed. Bamboo linear fiber 6 in the form of a tape is treated with at least one bonding material 7 as described above and is bonded to a central carrier core 2. This assembly is forced through a die 9 to produce a rectangular beam cross-section. The die 9 operation, the extracting, and cooling are identical to the operation described for producing poles or pilings.

Figure 5:
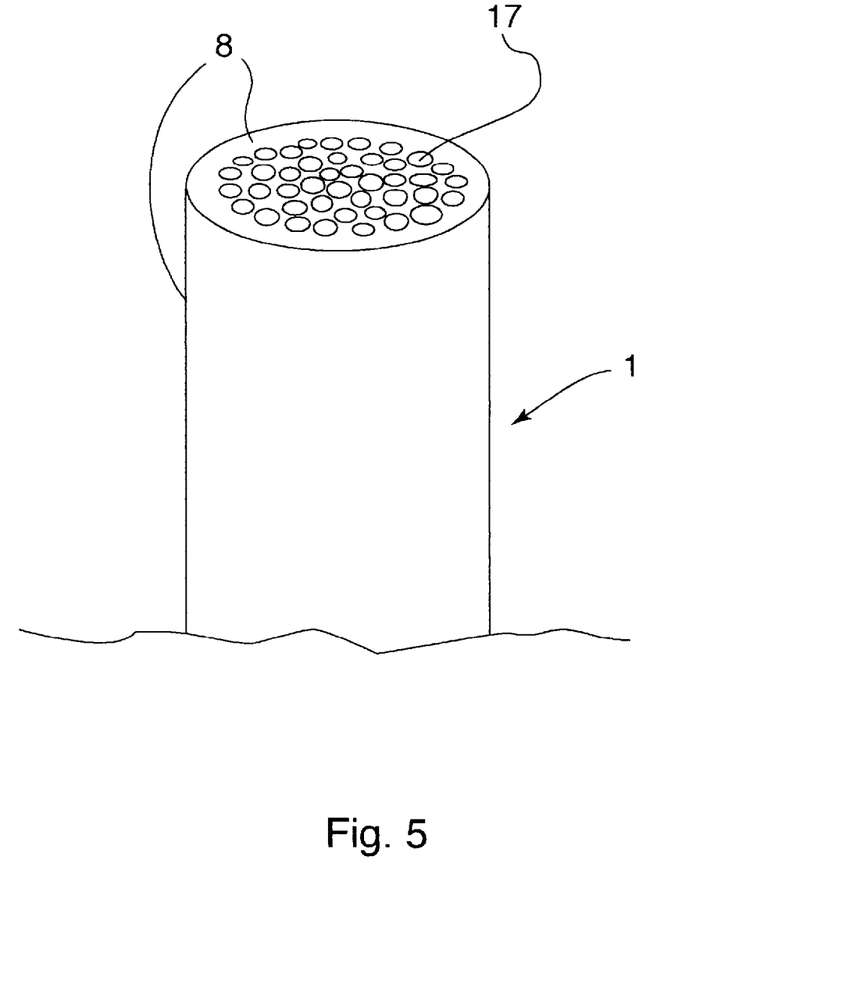
FIG. 5 is an elevational view of a supporting column made according to this invention.

For making columns having maximum compressional load-carrying capacity, the bamboo culms 17 are not split, but are left in their original hollow shape. These bamboo culms 17 are treated with at least one of the bonding materials 7 named above and are inserted into a mold 18. The synthetic polymer is then introduced into the mold 18 to bond to, and surround, the bamboo culms 17. In this way, support columns of exceptional load-carrying ability and the ability to withstand seismic events and other horizontal pressures are produced.

I claim:

1. A method of making a load-carrying structure comprising:
   (a) presenting a plurality of bamboo fibers of approximately dimensionally equal sizes,
   (b) priming the bamboo fibers with a binder so that they will adhere to synthetic polymers,
   (c) introducing the treated bamboo fibers and a synthetic polymer into a heated die capable of producing a plastic column in such a way as to form a mixture of a plurality of bamboo fibers and synthetic polymer wherein the bamboo fibers are surrounded by the synthetic polymer,
   (d) extruding a column of the mixture, and
   (e) sawing the column to produce a load-carrying structure.

2. The method of claim 1, wherein the binder is at least one member selected from the group consisting of maleated polypropylene, maleated polyethylene, maleic anhydride, hydroxyl methacrylate, silane compounds, N-vinyl pyridine, N-vinyl caprolactam, N-vinyl carbazole, methacrylic acid, ethyl methacrylate, isobutyl methacrylate, sodium styrene sulfonate, bis-vinyl phosphate, divinyl ether-ethylene glycol, vinyl acetate, vinyl toluene, vinylidene chloride, chloroprene, isoprene, dimethylaminoethyl methacrylate, isocetylvinyl ether, acrylonitrile, glycidyl methacrylate, N-vinyl pyrrolidone, acrylic acid, ethyl acrylate, itaconic acid, methyl acrylate, sodium vinyl sulfonate, cetyl vinyl ether, divinyl ether-butanediol, and octadecyl vinyl acetate.

3. The method of claim 1, wherein the bamboo fibers are in the form of split bamboo culms.

4. The method of claim 1, wherein the bamboo fibers are in the form of a tape.

5. A method of making a load-carrying structure which comprises:
   (a) securing a plurality of bamboo fibers treated with a binder to a carrying core to form a core assembly comprising a carrying core with secured bamboo fibers,
   (b) inserting the core assembly into a mold so that the core assembly is in the substantial center of the mold and is separated from the mold by open space,
   (c) heating the mold,
   (d) injecting a synthetic polymer into the heated mold so as to fill the spaces between the core assembly and the mold,
   (e) cooling the mold to form a load-carrying structure and removing the load-carrying structure from the mold.

6. The method of claim 5, wherein the binder is at least one member selected from the group consisting of maleated polypropylene, maleated polyethylene, maleic anhydride, hydroxyl methacrylate, silane compounds, N-vinyl pyridine, N-vinyl caprolactam, N-vinyl carbazole, methacrylic acid, ethyl methacrylate, isobutyl methacrylate, sodium styrene sulfonate, bis-vinyl phosphate, divinyl ether-ethylene glycol, vinyl acetate, vinyl toluene, vinylidene chloride, chloroprene, isoprene, dimethylaminoethyl methacrylate, isocetylvinyl ether, acrylonitrile, glycidyl methacrylate, N-vinyl pyrrolidone, acrylic acid, ethyl acrylate, itaconic acid, methyl acrylate, sodium vinyl sulfonate, cetyl vinyl ether, divinyl ether-butanediol, and octadecyl vinyl acetate.

7. The method of claim 6, wherein the carrying core is wood.

* * * * *